(12) United States Patent
Xiao

(10) Patent No.: US 7,829,052 B2
(45) Date of Patent: Nov. 9, 2010

(54) CATALYTIC REACTION BETWEEN METHANOL AND A PEROXIDE

(75) Inventor: Tiancun Xiao, Oxford (GB)

(73) Assignee: Isis Innovation Limited, Oxfordshire (GB)

( * ) Notice: Subject to any disclaimer, the term of this patent is extended or adjusted under 35 U.S.C. 154(b) by 0 days.

(21) Appl. No.: 10/588,156

(22) PCT Filed: Feb. 4, 2005

(86) PCT No.: PCT/GB2005/000401

§ 371 (c)(1), (2), (4) Date: Aug. 1, 2006

(87) PCT Pub. No.: WO2005/075342

PCT Pub. Date: Aug. 18, 2005

(65) Prior Publication Data

US 2007/0167532 A1    Jul. 19, 2007

(30) Foreign Application Priority Data

Feb. 4, 2004    (GB) ................. 0402487.3

(51) Int. Cl.
*C01B 3/22* (2006.01)
*C01B 31/18* (2006.01)
*C01B 31/20* (2006.01)
*C01B 3/26* (2006.01)

(52) U.S. Cl. ............... 423/418.2; 252/373; 423/437.1; 423/648.1; 423/650; 423/651

(58) Field of Classification Search ........... 423/648, 423/650, 651, 652, 648.1, 437.1, 418.2; 252/373
See application file for complete search history.

(56) References Cited

U.S. PATENT DOCUMENTS

| 3,607,066 A | 9/1971 | Basch et al. |
| 6,485,851 B1 | 11/2002 | Narayanan et al. |
| 7,022,306 B1 * | 4/2006 | Oroskar et al. ............ 423/648.1 |
| 7,344,789 B2 * | 3/2008 | Barber et al. ................. 429/17 |

FOREIGN PATENT DOCUMENTS

| JP | 2001226102 | 8/2001 |
| JP | 2002343403 | 11/2002 |
| WO | 2005015658 | 2/2005 |

OTHER PUBLICATIONS

Hackh's Chemical Dictionary, Fourth Edition (1969), McGraw-Hill Book Company, 421,422.*
English Abstract of JP 2001226102.
English Abstract of JP 2002343403.

* cited by examiner

*Primary Examiner*—Wayne Langel

(57) ABSTRACT

A process for initiating a reaction between methanol and a peroxide to produce a gas, which comprises contacting methanol and peroxide in the liquid phase and at a pressure equal to, below or above atmospheric pressure in the presence of a catalyst comprising at least one group 7, 8, 9, 10 or 11 transition metal.

15 Claims, No Drawings

CATALYTIC REACTION BETWEEN METHANOL AND A PEROXIDE

The present invention relates to a process involving a reaction between methanol and a peroxide to produce a gas, in particular a process which uses a catalyst.

Methanol is known to react with hydrogen peroxide. For example, JP-A-2001-226102 discloses the simultaneous reaction of methanol with both water and hydrogen peroxide. In order to initiate the reaction in the gas phase over a solid catalyst, the reactants are heated to 230° C. The reaction is exothermic, so after the reaction has started it will continue with little or no additional heat input. However, hydrogen peroxide may decompose into steam and oxygen at such high temperatures before it reacts with the methanol. It would be desirable to initiate the reaction without heating the reactants to such a high temperature, especially to initiate the reaction at a temperature below the boiling point of the reactants such that the reaction is able to occur in the liquid phase. Direct heating is inefficient and, in some instances, unavailable, for example when reacting the reactants to produce hydrogen in a moving vehicle or portable electrical appliance. Furthermore heating hydrogen peroxide to such a high temperature can be dangerous since it is explosive.

We have now discovered a process in which methanol and peroxide can be directly reacted together without initially having to heat them to such a high temperature. This process utilises a particular catalyst.

Accordingly the present invention provides a process for initiating a reaction between methanol and a peroxide to produce a gas such as hydrogen, carbon dioxide, carbon monoxide, methane and/or oxygen which comprises contacting methanol and a peroxide in the liquid phase at a pressure equal to, below or above atmospheric pressure in the presence of a catalyst comprising at least one group 7, 8, 9, 10 or 11 transition metal.

When referring to groups of the periodic table of elements, the IUPAC convention has been used. Group 7, 8, 9, 10 and 11 transition metals are also known as Group VIIB, VIII and IB transition metals.

Preferably the pressure is equal to or above atmospheric pressure.

In the process of the present invention the reaction between methanol and peroxide is initiated by contacting the reactants in the liquid phase in the presence of a particular catalyst. The reaction occurs in the same reaction medium. Thus, the methanol and peroxide reactants can come into contact with one another in the same medium and not across a membrane, such as a fuel cell membrane.

It has surprisingly been found that little if any heat has to be provided to the system in order to initiate the reaction. After the reaction is initiated the methanol and peroxide continue to react since the reaction is exothermic. Although the catalyst need not remain in the reaction system after the reaction has been initiated, in practice it is usual for the catalyst to remain in place rather than being removed.

The methanol can be used by itself or in admixture with other components such as, for example, other alcohols or hydrocarbons, for example $C_2$ to $C_4$ alcohols, such as ethanol, propanol and butanol, gasoline, alkanes such as pentane and hexane, diesel or water. Since the reaction is exothermic, once the reaction between methanol and peroxide has been initiated, heat is generated which can itself cause a reaction to initiate between additional components such as between ethanol, gasoline and/or diesel and the peroxide or between the methanol and water.

In one embodiment, the heat generated by the reaction between methanol and peroxide is used to drive a reforming reaction. The reaction between methanol and peroxide may be used to provide some or all of the heat necessary for the reforming reaction, allowing the reforming reaction to be carried out with little or no additional heating. In one embodiment, at least 50%, preferably, at least 80%, more preferably, at least 95%, yet more preferably 100%, of the heat necessary to drive the reforming reaction is provided by the reaction between methanol and peroxide.

The water required for the reforming step may be added to the reaction or may be produced in situ, for example, as a result of the reaction between the methanol and peroxide.

The reforming reaction may be a direct reforming reaction between methanol and water. Alternatively or additionally, other organic compounds may be reformed in the reforming step. Examples of compounds that may be reformed include alcohols and hydrocarbons. Suitable alcohols include $C_1$ to $C_8$ alcohols, preferably, $C_1$ to $C_4$ alcohols, such as methanol, ethanol, propanol and butanol. Suitable hydrocarbons include alkanes, such as $C_1$ to $C_{30}$ alkanes, for example, $C_1$ to $C_{25}$ alkanes. Examples of suitable alkanes include methane, ethane, propane, butane, pentane, hexane, heptane, octane and mixtures thereof. Gasoline and/or diesel may also be reformed. Reforming can take place to form hydrogen and carbon dioxide, optionally together with carbon monoxide. Methane may also be present in the product stream, for example, as a by-product.

If desired, any carbon monoxide produced in the reforming reaction may be reacted with water and converted to carbon dioxide and hydrogen in a water gas shift reaction. The reforming reaction, therefore, may optionally be carried out as a precursor to a water gas shift reaction. The water required for this water gas shift reaction may be added to the products of the reforming step, or may be residual water from the reforming step or the reaction between methanol and peroxide.

The water gas shift reaction may be carried out under any suitable reaction conditions and using any water gas shift suitable catalyst(s). For example, temperatures of 150 to 600° C., preferably 200 to 500° C., for example 200 to 250° C. or 300 to 450° C. may be employed. Suitable water gas shift catalysts include catalysts based on copper and/or zinc, optionally supported on a support. Examples include Cu/Zn/$Al_2O_3$ and CuO/Mn/ZnO. The heat necessary for the water gas shift reaction may be provided at least in part by the exothermic reaction between methanol and peroxide.

According to a further aspect of the invention, there is provided an apparatus for carrying out a reforming reaction, said apparatus comprising
- storage means containing methanol and peroxide,
- a housing containing a catalyst comprising at least one group 7, 8, 9, 10 or 11 transition metal, and
- means for introducing the methanol and the peroxide into the housing.

The methanol and peroxide are preferably stored in separate storage means.

In use, methanol and peroxide are transferred from the storage means into the housing and brought into contact with the catalyst. The reaction between methanol and peroxide is initiated by contacting the reactants in the liquid phase with the catalyst. As explained above, little or no heat has to be provided to the system in order to initiate the reaction. After the reaction is initiated the methanol and peroxide continue to react since the reaction is exothermic.

The heat generated by the reaction between methanol and peroxide is used at least in part to drive a reforming reaction.

For example, at least 50%, preferably, at least 80%, more preferably, at least 95%, yet more preferably 100%, of the heat necessary to drive the reforming reaction is provided by the reaction between methanol and peroxide. Thus, the apparatus of the present invention need not include additional means for heating the reforming reaction.

The reactant feeds introduced into the housing also need not be heated.

Water for the reforming reaction may be introduced into the housing and/or may be generated in situ, for example, as a result of the reaction between methanol and peroxide.

In one embodiment, at least part of the methanol is reformed. Alternatively or additionally, the heat generated by the reaction between methanol and peroxide is used to reform at least one further organic compound, which is preferably introduced into the housing via an inlet. In one embodiment, the apparatus may include storage means for the organic compound. Alternatively or additionally, organic compound may be stored with the methanol.

The organic compound may be an alcohol and/or a hydrocarbon. Suitable alcohols include $C_1$ to $C_8$ alcohols, preferably, $C_1$ to $C_4$ alcohols, such as methanol, ethanol, propanol and butanol. Suitable hydrocarbons include alkanes, such as $C_1$ to $C_{30}$ alkanes, for example, $C_1$ to $C_{25}$ alkanes. Examples of suitable alkanes include methane, ethane, propane, butane, pentane, hexane, heptane, octane and mixtures thereof. Gasoline and/or diesel may also be reformed.

As mentioned above, the reforming reaction may produce a product stream comprising hydrogen and carbon dioxide. The product stream, and in particular the hydrogen produced, may be withdrawn from the housing and used for any suitable purpose. In one embodiment, for example, the hydrogen produced in the reforming reaction may be used to operate a fuel cell. Accordingly, the apparatus of the present invention may be used in combination with a fuel cell.

The reforming reaction may also produce carbon monoxide. Any carbon monoxide produced may be converted to carbon dioxide and hydrogen using a water gas shift reaction. Thus, the housing of the apparatus preferably contains a water gas shift catalyst located downstream of the catalyst comprising at least one group 7, 8, 9, 10 or 11 transition metal. Suitable water gas shift catalysts are described above. The product stream from the water gas shift reaction is typically richer in hydrogen than the product stream emerging from the reforming reaction. In one embodiment, this hydrogen-enriched product stream is used, directly or indirectly, to operate a fuel cell.

The catalyst comprising at least one group 7, 8, 9, 10 or 11 transition metal and/or the water gas shift catalyst may be provided in the form of a removable insert that may be removed from the housing and replaced when required.

The peroxide employed in the process and apparatus of the present invention may be any suitable peroxide. For example, inorganic peroxides and/or organic peroxides may be employed. Examples of suitable inorganic peroxides include hydrogen peroxide and metal peroxides. Suitable metal peroxides include peroxides of alkali metals, such as lithium, sodium and potassium, and alkaline earth metals, such as magnesium, calcium and barium. Specific examples of metal peroxides include sodium peroxide and barium peroxide.

Examples of organic peroxides include alkyl peroxides, such as t-butyl peroxide and cumyl peroxide. Benzoyl peroxide may also be used.

The peroxide can be used in pure form, but is preferably used in solution, especially in aqueous solution or alcohol solution. It may also be in the form of pellets, such as a urea pellets.

In a preferred embodiment, the peroxide is hydrogen peroxide. The hydrogen peroxide can be used in pure form, but is preferably used in solution, especially in aqueous solution or alcohol solution. It may also be in the form of pellets, such as a urea pellets. Generally the hydrogen peroxide is used in an aqueous solution, alcohol solution or pellets comprising at least 6 vol % hydrogen peroxide, preferably 8 vol % hydrogen peroxide, more preferably at least 10 vol %, even more preferably 15 vol %, yet more preferably 20 to 90 vol %, for example 20 to 80 vol %, and most preferably 25 to 60 vol %.

Hydrogen peroxide may also be used in the form of an adduct. Suitable adducts include percarbonates, such as, for example, sodium percarbonate (hydrogen peroxide-sodium carbonate).

The reaction between methanol and peroxide can vary, for example depending upon the stoichiometric amounts of the reactants which are present. For example, using hydrogen peroxide as an illustrative peroxide, the reaction may comprise at least one of, or all of:

$$2CH_3OH + H_2O_2 \rightarrow 5H_2 + 2CO_2$$

$$2CH_3OH + H_2O_2 \rightarrow 2H_2O + 2CO + 3H_2;$$

$$CH_3OH + H_2O_2 \rightarrow CO_2 + 2H_2 + H_2O; \text{ and}$$

$$CH_3OH + 2H_2O_2 \rightarrow H_2 + CO_2 + 3H_2O.$$

The reaction may additionally comprise other reactions such as:

$$CH_3OH + 3H_2O_2 \rightarrow CO_2 + 5H_2O.$$

Desirably the methanol and peroxide are present in a molar ratio of 4:1 to 1:4, preferably 3:1 to 1:3, for example, 2.5:1 to 1:2.5. In one embodiment, the methanol and peroxide are present in a molar ratio of 2:1 to 1:2, more preferably 1.5:1 to 1:1.5, most preferably about 1:1, especially to increase the yield of hydrogen. When methanol and hydrogen peroxide are employed, the methanol and hydrogen peroxide are present in a molar ratio of 2:1 to 1:2, more preferably 1.5:1 to 1:1.5, most preferably about 1:1, especially to increase the yield of hydrogen.

An additional solvent may be present if desired such as, for example, water. The water is preferably used in the liquid phase. The reactants are contacted in the liquid phase, that is both the methanol and the peroxide (e.g. hydrogen peroxide) are in the liquid phase. Of course, during the subsequent reaction, due to the presence of heat one or more than one of the reactants may be at least partly in the gaseous phase.

An additional gas may be present if desired such as, for example, an oxygen-containing gas, such as air. Thus, the reaction between methanol and peroxide may be a reaction between methanol, peroxide and oxygen. For example, using hydrogen peroxide as an illustrative peroxide, the reaction may be:

$$CH_3OH + H_2O_2 + O_2 \rightarrow 3H_2O + CO_2$$

The catalyst comprises a group 7, 8, 9, 10 or 11 transition metal. Thus the catalyst comprises one or more of Fe, Co, Ni, Cu, Tc, Ru, Rh, Pd, Ag, Re, Os, Ir, Pt and Au. Preferably, the metal is selected from groups 8, 9, 10 and/or 11 of the periodic table. Suitable group 8, 9, 10 or 11 metals include Ni, Co, Cu, Ag, Ir, Au, Pd, Ru, Rh and Pt. The metal is preferably platinum. Combinations of two or more metals may be present in the catalyst.

The catalyst is preferably promoted, for example with one or more oxides of alkali metal, alkaline earth metal, rare earth or other transition metals. Examples of suitable promoters are Sn, Ni, Ag, Zn, Au, Pd, Mn and other transition metals in the form of the metal, oxide or a salt. The catalyst may also be modified with one or more further components, such as boron, phosphorus, silica, selenium or tellurium.

The metal may be used in metallic form. In order to act effectively as a catalyst it is desirably in particulate form with a small particle size, as is well known to those skilled in the art. The catalyst may be unsupported. Desirably, however, it is supported. In an embodiment, for example, the catalyst is supported on the side of a reaction vessel or tube or on an inert particulate support. For example, very fine nickel or platinum particles may be plated in an inner layer on a stainless steel tube for methanation in a GC for FID detection.

The support may be any support which is capable of bearing the catalyst in the desired reaction. Such supports are well known in the art. The support may be an inert support, or it may be an active support. Examples of suitable supports include carbon supports and/or solid oxides, such as alumina, modified alumina, spinel oxides, silica, modified silica, magnesia, titania, zirconia, a zeolite, β-aluminate and manganese oxide, lanthanum oxide or a combination thereof. The alumina or modified alumina may be, for example, α-alumina, β-alumina or γ-alumina. β-alumina and spinel oxides such as barium hexaaluminate have been found to be particularly useful in view of their stability. The carbon may be in the form, for example, of active carbon, graphite or carbon nanotubes. A molecular sieve, such as a zeolite, may be chosen depending on the desired final product. Thus, for example, it may comprise pores or channels. Phosphide, boride, sulfide and/or metal supports may also be suitable.

Preferably the support is porous. The particle size is desirably 0.1 μm to 10 mm, more preferably 0.2 μm to 0.4 mm. The surface area is desirably greater than 1 m$^2$/g, preferably greater than 5 m$^2$/g. One or a mixture of two or more supports may be used.

The metal employed as the catalyst may also be in the form of a complex or compound thereof. Examples are platinum carbonyl complexes and platinum methoxy complexes, and platinum complexes with ligands such as chlorine, phosphine or organic aromatic species such as benzene or cyclopentadiene, such as $(CO)_5Co_2(CO)_2Pt_2(CO)$ $(PPh_3)_2$ or $Pt_3(CO)_2$ $(PPh_3)_4$.

Before use, the catalyst may, if desired, be activated, for example with hydrogen or a hydrogen-containing gas.

The initiation can desirably be carried out at about room temperature, for example at about 20° C. Preferably the initiation is carried out without heating the reactants or providing any other source of initiation. However, heat can be supplied if necessary, although the amount of heat supplied need not be too great. Thus one or both of the reactants, or the reaction mixture, be at, for example, less than 80° C., preferably less than 50° C. and more preferably less than 30° C.

The reaction between methanol and peroxide (e.g. hydrogen peroxide) has a number of uses. For instance, when propulsion is needed (e.g. for a rocket or for steering a satellite), the reaction between methanol and peroxide (e.g. hydrogen peroxide) can be used. The reaction may also be used to generate heat, for example, for the start-up of an autocatalyst or to power an engine.

When hydrogen is produced it may be important to restrict the amount of atmospheric oxygen which is available, for example by carrying out the reaction in an enclosed or pressure vessel.

When hydrogen is prepared the hydrogen may itself be used in a further process, for example in a fuel cell. Desirably the process of the present invention is carried out in or in association with a fuel cell in order to provide the hydrogen for a subsequent reaction or can be used to provide a rapid generation of gas and/or heat, for example for use in inflating an air bag, to pressurise mechanical equipment such as a hydraulic or lift, or for the quick start up of a catalytic exhausted gas converter or $NO_x$ purifier.

The present invention is now further described in the following Examples.

EXAMPLE 1

A mixture of 7 ml pure methanol and 21 ml 37% $H_2O_2$/$H_2O$ is held in an autoclave, then 40 mg of a $H_2$-reduced 5 wt % Pt/γ-$Al_2O_3$ is added to the mixture while stirring. The temperature in autoclave increases from room temperature to 260° C. and the pressure in the autoclave increases to 346 psi in 10 seconds. Analysis of the products using an Autosystem GC shows hydrogen, carbon monoxide, methane and carbon dioxide as the products. The hydrogen yield from the reaction is over 85%, and the methanol conversion is 96%.

The example above may be repeated with $H_2$-reduced 5 wt % Pt/$K_2O$/8-$Al_2O_3$ with similar results.

EXAMPLE 2

A mixture of 7 ml pure methanol and 15 ml 50% $H_2O_2$/$H_2O$ is held in an autoclave, then 100 mg of a $H_2$-reduced 5 wt % Pt/γ-$Al_2O_3$ is added to the mixture while stirring. The temperature in autoclave increases from room temperature to 290° C. and the pressure in the autoclave increases to 360 psi in 10 seconds. The analysis of the products using an Autosystem GC shows hydrogen, carbon monoxide, methane and carbon dioxide as the products.

The hydrogen yield from the reaction is over 90%, and methanol conversion is 98%.

The example above may be repeated with $H_2$-reduced 5 wt % Pt—$Fe_2O_3$/8-$Al_2O_3$ with similar results.

EXAMPLE 3

A mixture of 7 ml pure methanol and 15 ml 50% $H_2O_2$/$H_2O$ is held in an autoclave, then 100 mg of a $H_2$-reduced 6 wt % Pd—Ni/$Al_2O_3$—$MnO_2$ is added to the mixture while stirring, the autoclave is heated to 50° C. while stirring. The temperature in autoclave increased from room temperature to 220° C. and the pressure in the autoclave increased to 330 psi in 15 seconds. The analysis of the products using an Autosystem GC shows hydrogen, carbon monoxide, methane and carbon dioxide as the products.

The hydrogen yield from the reaction is over 80%, and the methanol conversion is 90%.

EXAMPLE 4

A reforming catalyst is prepared by impregnating a $MnO_2$ catalyst support with an aqueous solution of $PdCl_2$. The impregnated support is then dried, calcined at 400° C. and reduced in a flow of $H_2$ gas at 400° C. for 2 hours. The resulting catalyst has a Pd content of 4.2 weight %.

A reformer is loaded with 0.25 g of the reforming catalyst. A mixture of methanol and a 50% solution of $H_2O_2$ in $H_2O$ is then fed into the reformer at a rate of 0.22 ml/min. The ratio of methanol to $H_2O_2$ in the feed stream is 1:1. The temperature is maintained at 190 to 250° C. without external heating.

Analysis of the products shows water, hydrogen, carbon monoxide, methane and carbon dioxide as the products. The hydrogen yield is over 80%.

EXAMPLE 5

The process of Example 4 is repeated except that 0.3 g of a water gas shift catalyst (Cu/Zn/Al$_2$O$_3$, available from Keli Chemical Company) is placed downstream of the reforming catalyst.

Analysis of the products shows water, hydrogen, methane and carbon dioxide as the products.

The hydrogen yield is increased to 99%.

EXAMPLE 6

15 ml of a mixture of 50% H$_2$O$_2$, 35% H$_2$O and 15% CH$_3$OH is passed over a magnesium oxide-supported Ru catalyst in the presence of air. An exothermic reaction occurs causing the temperature of the catalyst bed to rise to 450° C. without external heating.

Analysis of the products shows that all the methanol is converted into H$_2$O and CO$_2$.

EXAMPLE 7

5 ml of a mixture of 30% H$_2$O$_2$, 40% H$_2$O and 30% CH$_3$OH is sprayed over a 3 wt % Pd—Pt/Al$_2$O$_3$ catalyst in the presence of air. An exothermic reaction occurs causing the temperature of the catalyst to rise to 400° C. without external heating.

Analysis of the products shows that all the methanol is converted into H$_2$O and CO$_2$.

The invention claimed is:

1. A process for initiating a reaction between methanol and hydrogen peroxide in the presence of a catalyst to produce a gas, which comprises contacting methanol and hydrogen peroxide in liquid phase and at a pressure equal to or above atmospheric pressure in the presence of a catalyst in metallic form selected from the group consisting of nickel, cobalt, copper, silver, iridium, gold, palladium, ruthenium, rhodium and platinum to initiate reaction between said methanol and said hydrogen peroxide to produce said gas.

2. The process according to claim 1, wherein the hydrogen peroxide is in the form of an aqueous solution, an alcohol solution or urea pellets comprising at least 6 vol % hydrogen peroxide.

3. The process according to claim 1, wherein the reaction between methanol and hydrogen peroxide produces at least one product selected from the group consisting of hydrogen, carbon dioxide, carbon monoxide, methane and oxygen.

4. The process according to claim 1, wherein the methanol and hydrogen peroxide are present in a molar ratio of 2.5:1 to 1:3.

5. The process according to claim 4, wherein the methanol and hydrogen peroxide are present in a molar ratio of about 1:1.

6. The process according to claim 5, wherein the reaction is selected from the group consisting of:

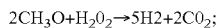

2CH$_3$O+H$_2$O$_2$→5H2+2CO$_2$;

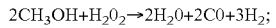

2CH$_3$OH+H$_2$O$_2$→2H$_2$O+2CO+3H$_2$;

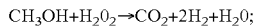

CH$_3$OH+H$_2$O$_2$→CO$_2$+2H$_2$+H$_2$O;

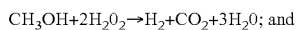

CH$_3$OH+2H$_2$O$_2$→H$_2$+CO$_2$+3H$_2$O; and

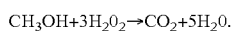

CH$_3$OH+3H$_2$O$_2$→CO$_2$+5H$_2$O.

7. The process according to claim 1, wherein the catalyst contains one or more catalyst promoters.

8. The process according to claim 1, wherein the initiation is carried out without heating the reactants.

9. The process according to claim 1, wherein the initiation is carried out at a temperature of less than 80° C.

10. The process according to claim 1, wherein the initiation is carried out at a temperature of less than 30° C.

11. The process according to claim 10, wherein the initiation is carried out at about room temperature.

12. The process as claimed in claim 1, which further comprises reforming an organic feed to produce a product stream comprising carbon dioxide, hydrogen and optionally carbon monoxide.

13. The process as claimed in claim 12, wherein the organic feed is at least one selected from the group consisting of an alcohol and a hydrocarbon.

14. The process as claimed in claim 12, wherein any carbon monoxide produced in the reforming step is converted into carbon dioxide by contacting the product stream with a water gas shift catalyst in the presence of water.

15. The process according to claim 1, which is carried out in a fuel cell, to power a rocket or to inflate an air bag, to pressurize mechanical equipment or for the quick start up of catalytic exhausted gas converter or NO$_x$ purifier.

* * * * *